United States Patent [19]

De Bisschop et al.

[11] Patent Number: 4,535,645

[45] Date of Patent: Aug. 20, 1985

[54] VEHICLE STEERING SUB-ASSEMBLY

[75] Inventors: James De Bisschop, Litchfield; Anthony A. Neri; Thomas J. Williams, both of Torrington, all of Conn.

[73] Assignee: The Torrington Company, Torrington, Conn.

[21] Appl. No.: 478,318

[22] Filed: Mar. 24, 1983

[51] Int. Cl.³ .............................................. B62D 1/16
[52] U.S. Cl. ..................................... 74/492; 464/179; 403/109; 403/383
[58] Field of Search .................. 74/492; 464/179, 180; 403/109, 361, 377, 383

[56] References Cited

U.S. PATENT DOCUMENTS 2,161,138  6/1939  Cutting ................................ 461/179
2,804,732  9/1957  Brockley ......................... 403/383 X
4,269,043  5/1981  Kizu et al. ............................ 74/492

FOREIGN PATENT DOCUMENTS 2105441  3/1983  United Kingdom ................. 74/492

Primary Examiner—Allan D. Herrmann
Assistant Examiner—Shirish Desai
Attorney, Agent, or Firm—Frank S. Troidl

[57] ABSTRACT

The sub-assembly includes a telescopically arranged rotatable driving shaft and rotatable driven shaft. Both shafts are substantially triangular in cross-section. A spring provides a pre-determined spring force having a magnitude to permit one shaft to slide within the other shaft. The complementary triangular shapes of the shafts causes the torque from the driving shaft to be transmitted to the driven shaft without rotational lash.

4 Claims, 5 Drawing Figures

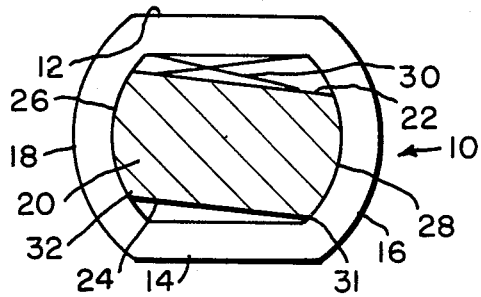
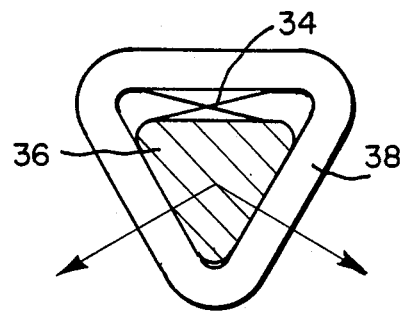
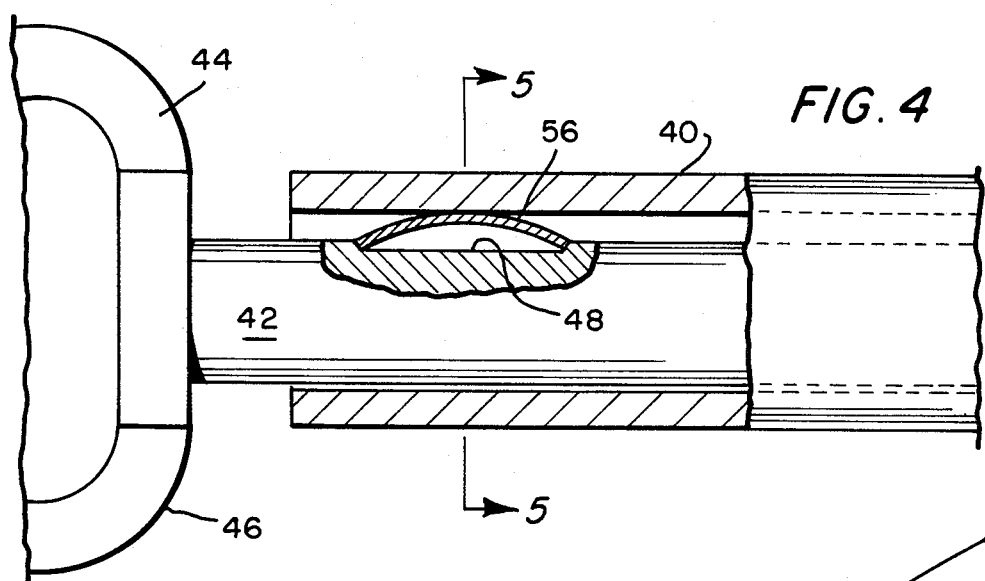
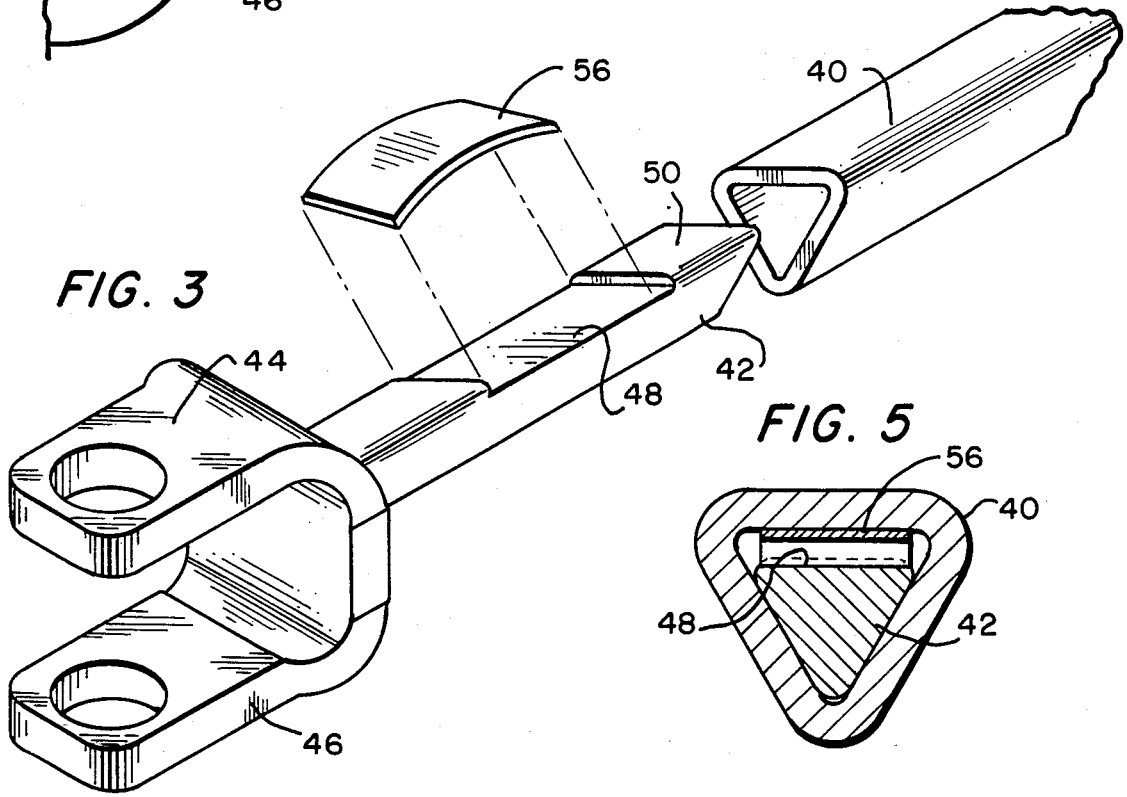
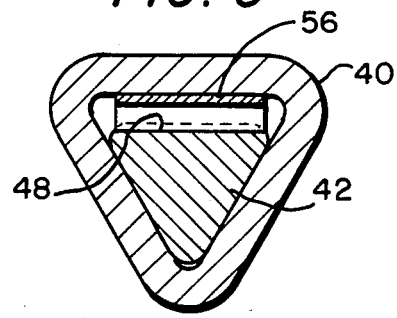

VEHICLE STEERING SUB-ASSEMBLY

This invention relates to vehicle steering assemblies. More particularly, this invention is a novel, mechanically driven steering column sub-assembly of the type which incorporates a one direction spring force.

Present day motor vehicles often include one or more sub-assemblies in the steering column which have one shaft telescopically arranged relative to a second shaft. These shafts are non-circular shaped so as to be capable of transmitting torque between the driving shaft and the driven shaft. A spring is compressed between the two shafts and the spring frictionally engages the two shafts to permit the slidable movement of one shaft within to the other shaft.

One of the problems with present day spring bias-type steering sub-assemblies is that with the non-circular shapes of the telescoping members there is an initial relative rotational movement of the driving member with respect to the driven shaft before the two shafts rotate in unison. This causes what is known as "rotational lash" which creates a great deal of noise.

The new vehicle steering sub-assembly of this invention is constructed so that the rotational lash and the noise associated with it does not occur.

Briefly described, this invention is a vehicle steering sub-assembly comprising a telescopically arranged coaxial rotatable driving shaft and rotatable driven shaft. The shafts have complementary substantially triangular cross-sectional shapes. A spring continuously engages both shafts. The spring is constructed to provide a predetermined spring force of a magnitude to permit one shaft to slide within the other shaft. The complementary cross-sectional shapes of the two shafts prevent relative rotation of the rotatable driving shaft with respect to the rotatable driven shaft.

The invention as well as its many advantages may be further understood by reference to the following detailed description and drawings in which:

FIG. 1 is a schematic view illustrating one type of prior art sub-assembly;

FIG. 2 is a schematic view illustrating the reason why the invention eliminates rotational lash and the noise associated with it;

FIG. 3 is a perspective view of a preferred embodiment of the invention;

FIG. 4 is a side view, partially in section, of the preferred embodiment of FIG. 3; and FIG. 5 is a sectional view taken along lines 5—5 of FIG. 4.

In the various figures, like parts are referred to by like numbers.

Referring to the drawings and, more particularly, to FIG. 1, a typical prior art vehicle steering sub-assembly is shown schematically. The sub-assembly of FIG. 1 includes an outer tubular member 10 having two opposite straight sides 12 and 14 interconnected by two opposite curved sides 16 and 18. Mounted within the outer tubular shaft 10 is an inner solid shaft 20 having two opposite straight sides 22 and 24 interconnected by opposite curved sides 26 and 28. The shaft 20 is shown turned with respect to the tube 10 to illustrate the noise or rattle problem present with shafts of the prior art.

The two shafts are telescopically mounted with respect to one another with a spring force being exerted by a spring 30, shown schematically in FIG. 1, which is located between the outer periphery of the inner shaft 20 and the inner periphery of the outer tubular shaft 10.

When the outer tubular member 10 is rotated, it will turn before the inner shaft 20 begins to rotate in unison with the tubular member 10. Because of the shapes of the tubular member 10 and the shaft 20, the outer member 10 will contact the inner member 20 at certain points, such as points 31 and 32 causing a rotational lash which creates noise. This noise, of course, is undesirable.

In the schematic representation of the invention shown in FIG. 2, the spring 34 is located between the triangularly shaped solid inner member 36 and the inner periphery of the coaxial complementary triangular shaped tubular outer member 38. The triangular shapes of the shafts 36 and 38 create a "wedging" action when the spring 34 exerts a spring force between them. The particular shape distributes the spring force in the two directions shown by the arrows in FIG. 2. There is no initial relative turning of the outer tubular member 38 with respect to the inner solid shaft 36 so that there is no engagement of any edges of the solid shaft 36 against the inside perimeter of the tube 38. Therefore, the driven shaft reacts immediately with rotation of the driving shaft and there is no rotational lash and no noise.

FIG. 3 is a perspective view of a preferred embodiment of the invention. The driving shaft 40 is a triangularly shaped hollow tube which may be connected to the steering wheel column. The driven member 42 is a coaxial, telescopically arranged triangularly shaped solid shaft 42. As seen from FIG. 4 and FIG. 5, two of the sides of shaft 42 abut against corresponding sides of tubular shaft 40. Shaft 42 extends from a yoke member including ears 44 and 46.

A transverse groove 48 is formed across the flat surface 50 of the inner shaft 42. Groove 48 has a uniform depth and a uniform length. The length of the groove is somewhat greater than its width.

The longitudinal edges of the groove 48 receive the longitudinal ends of a flat spring 56. When assembled as shown in FIG. 4, the flat spring 56 is compressed into the groove 48 between the inside periphery of the tubular driving member 40 and the outside periphery of the solid driven member 42. Though compressed, the flat spring 56 bows outwardly from said groove 48 into engagement with the outer tubular shaft 40. The force of the flat spring 56 is such that axial movement of the outer shaft 40 relative to the inner shaft 42 is permitted.

In operation immediately upon any rotation of the outer driving tubular member 40, the inner driven solid shaft 42 rotates in synchronism with the rotation of the shaft 40. Because of the triangular shapes of the two shafts there is no corner locking or rotational lash or any other relative movement of the two shafts causing a resulting noise.

We claim:

1. In a vehicle steering assembly: a telescopically arranged coaxial rotatable driving shaft and rotatable driven shaft, said shafts having complementary substantially triangular cross-sectional shapes with two of the sides of the rotatable driven shaft abutting against corresponding sides of the rotatable driving shaft to prevent relative rotation of the rotatable driving shaft with respect to the rotatable riven shaft; and a spring continuously engaging, the third side of the rotatable driven shaft and the corresponding side of the rotatable driving shaft, the spring being adapted to provide a predetermined spring force of a magnitude to permit one shaft to slide within the other shaft.

2. A vehicle steering assembly in accordance with claim 1 wherein: the rotatable driven shaft is the inner shaft and the rotatable driving shaft is a tubular outer shaft, and the spring is mounted on the inner shaft.

3. A vehicle steering assembly in accordance with claim 2 wherein: a groove is provided in the third side of the inner shaft and the spring is mounted within said groove and bears against the corresponding side of the tubular shaft.

4. A telescopically arranged vehicle steering assembly comprising: a rotatable hollow outer shaft; a rotatable inner shaft slidably received within the outer shaft; said inner and outer shafts having complementary cross-sectional shapes capable of relative axial movement and of transmitting a torque therebetween, the cross-sectional shape of the inner shaft and the outer shaft inner periphery being generally triangular with two of the sides of the inner shaft abutting against corresponding sides of the outer shaft; a groove formed across the third side of the inner shaft having a uniform depth and length; and a flat spring compressed into said groove and bowing outwardly from said groove into engagement with the outer shaft, the flat spring force being such that axial movement of the outer shaft is permitted relative to the inner shaft.

* * * * *